(12) United States Patent
Inapakolla et al.

(10) Patent No.: US 9,160,812 B2
(45) Date of Patent: Oct. 13, 2015

(54) SYSTEMS AND METHODS FOR DELIVERING AN APPLICATION OVER A MOBILE COMMUNICATIONS NETWORK

(75) Inventors: Veera Venkata Inapakolla, Jersey City, NJ (US); Shreeshah Vedagiri, Piscataway, NJ (US); Shankar Kulkarni, Bridgewater, NJ (US); Venkat Gaddam, Bridgewater, NJ (US)

(73) Assignee: Cellco Partnership, Basking Ridge, NJ (US)

(*) Notice: Subject to any disclaimer, the term of this patent is extended or adjusted under 35 U.S.C. 154(b) by 935 days.

(21) Appl. No.: 12/603,995

(22) Filed: Oct. 22, 2009

(65) Prior Publication Data

US 2011/0099230 A1    Apr. 28, 2011

(51) Int. Cl.
| | |
|---|---|
| G06F 15/16 | (2006.01) |
| H04L 29/08 | (2006.01) |
| G06F 9/445 | (2006.01) |
| H04W 4/00 | (2009.01) |
| H04L 12/58 | (2006.01) |

(52) U.S. Cl.
CPC ............ *H04L 67/34* (2013.01); *G06F 9/44536* (2013.01); *H04L 12/5835* (2013.01); *H04W 4/001* (2013.01)

(58) Field of Classification Search
CPC . G06F 9/44536; H04W 4/001; H04L 12/5835
See application file for complete search history.

(56) References Cited

U.S. PATENT DOCUMENTS

| | | | |
|---|---|---|---|
| 7,200,390 B1* | 4/2007 | Henager et al. | 455/419 |
| 7,409,208 B1 | 8/2008 | Clare et al. | |
| 7,752,292 B1* | 7/2010 | Katzer | 709/222 |
| 7,966,387 B1* | 6/2011 | Katzer | 709/222 |
| 2005/0131837 A1* | 6/2005 | Sanctis et al. | 705/64 |
| 2005/0193336 A1 | 9/2005 | Fux et al. | |
| 2005/0204351 A1 | 9/2005 | Jiang et al. | |
| 2008/0109528 A1* | 5/2008 | Knight et al. | 709/217 |
| 2009/0089775 A1* | 4/2009 | Zusman | 717/173 |
| 2009/0241104 A1* | 9/2009 | Amiga et al. | 717/174 |
| 2010/0137008 A1* | 6/2010 | Li et al. | 455/466 |
| 2010/0161506 A1* | 6/2010 | Bosenick et al. | 705/347 |

FOREIGN PATENT DOCUMENTS

| | | |
|---|---|---|
| GB | 2 358 556 A | 7/2001 |
| GB | 2 392 800 A | 3/2004 |
| WO | WO 2006/047764 A2 | 5/2006 |

OTHER PUBLICATIONS

Extended European Search Report issued in European Patent Application No. 10013821.3-2413, dated Apr. 19, 2011.

* cited by examiner

*Primary Examiner* — Ranodhi Serrao
*Assistant Examiner* — Thomas Richardson

(57) ABSTRACT

Systems, methods, and an article of manufacture for delivering an application to a mobile station are shown and described. In some instances, a list of mobiles stations not currently executing a specific application is generated, processed, and used to send a solicitation message to certain mobile station. Various mobile stations receive different versions of the application based on characteristics of the mobile station.

20 Claims, 3 Drawing Sheets

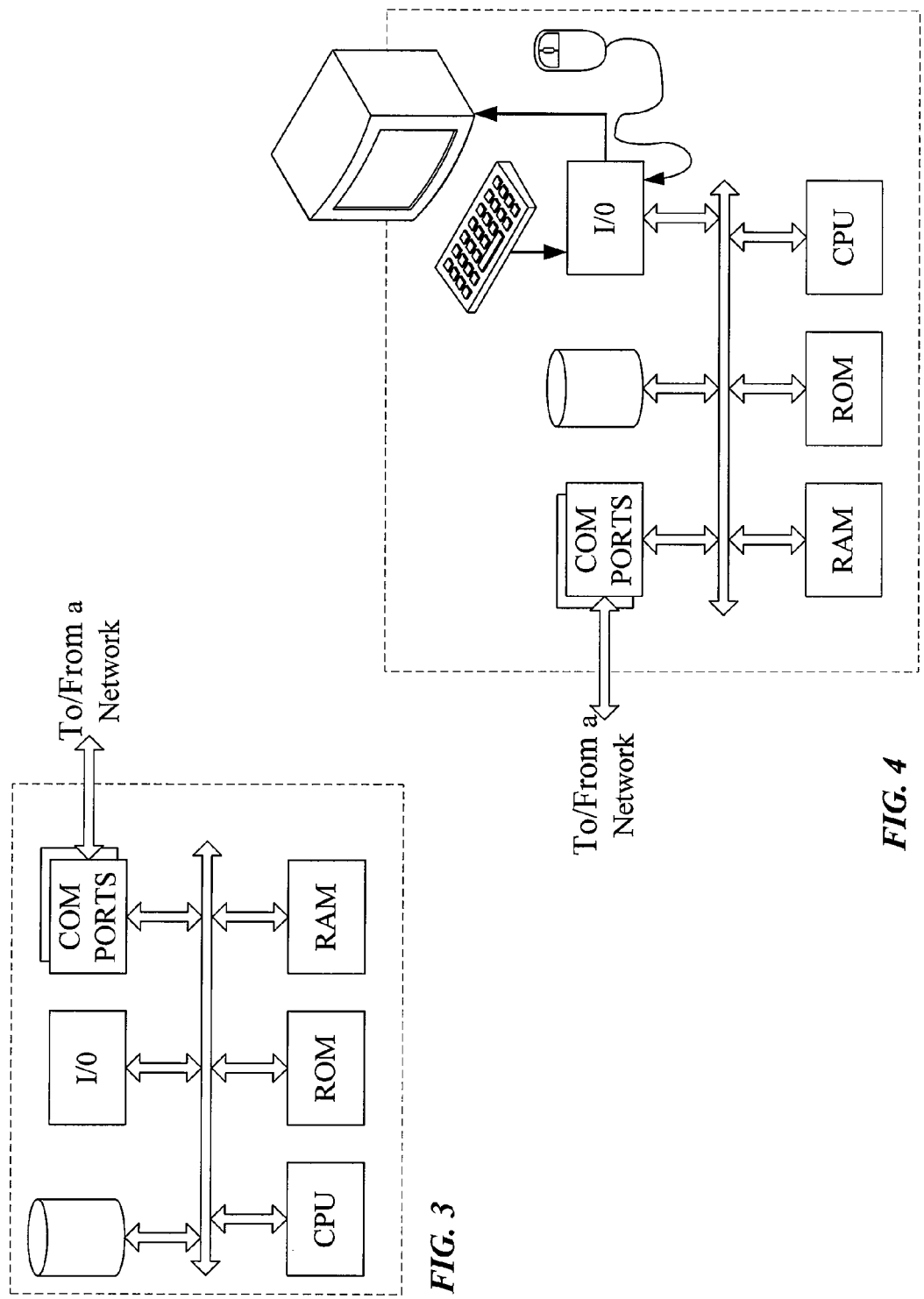

SYSTEMS AND METHODS FOR DELIVERING AN APPLICATION OVER A MOBILE COMMUNICATIONS NETWORK

TECHNICAL FIELD

The present subject matter relates to techniques and equipment for delivering an application to a mobile station over a mobile communications network, for example, for identifying whether a mobile station is executing a particular application and, if not, encouraging delivery of that application to the mobile station using a simple messaging service message.

BACKGROUND

One issue mobile station users face is the loss of their mobile station and their stored address and contact information (which is sometime referred to as an address book) resident on the lost mobile station. As such, applications have been developed that aid in backing up these important personal information. That is, a copy of the stored address and contact information is created and stored somewhere other than on the mobile station.

However, unless the customer has a back up file or record of the phone address book, there is no way to recover it if the device is lost, stolen or damaged. In some case, mobile users back up their address books manual. For example, by copying contacts onto a piece of paper or creating an electronic file to save on a computer or other storage medium. In order to add this information to a new device, the end user has to key in the contact information.

In response, some mobile network carriers offer back-up services either for a fee or for free. Despite encouraging the use of such programs, adoption rates of these applications are surprisingly low. Thus, a need exists for increasing participation in the use of back-up applications for mobile devices.

SUMMARY

The teachings herein are useful in promoting increased adoption and use of a backup application, or another application, on mobile devices of a mobile communications network. By pushing the application, in response to acquiesce by the mobile station user, to mobile stations that do not currently use the application, it is suggested that the number of mobile stations using the application will increase.

The equipment and techniques described herein provide the ability to determine which mobile stations are not using a backup application. In some instances, a simple messaging service message (SMS) notifies one or more customers of the backup assistant service (e.g., an application that executes on the mobile station). If the end user of the mobile station indicates they want to download the application, a follow-up SMS is returned to the mobile station that triggers the download of the application when the SMS is opened. Once the download completes, the customer follows the standard screen prompts to establish their application password and time of synchronization. The customer can schedule either daily, weekly or monthly automatic backups of the address book. Or the customer can manually backup contact information. The synchronization will occur at the time previously defined by the customer at the time of the application service set up.

In one instance, for example, a method distributes a backup software application to a mobile station. The method includes receiving a first file, at a customer care server, containing an identifier for each respective one of a plurality of mobile stations that are not executing the backup software application for creating a copy of the mobile station's address book for storage on a wireless communications network device, communicating the received file to a device management database, and receiving a second file the second file including the identifier for each respective one of the mobile stations that are not executing the backup software application and a corresponding platform identifier for each respective one of the mobile stations, the platform identifier corresponding to a make and model number of the respective mobile station. The method includes mapping a respective item identifier to each platform identifier, each respective item identifier corresponding to a respective version of the backup software application, transmitting a messaging service message to each of a plurality of the mobile stations that are not executing the backup software application, the message comprising an invitation to download the backup software application, processing a response from at least one of the mobile stations requesting the backup software application, and transmitting another messaging service message to the at least one mobile station that requested the backup software application in its response, the another messaging service message comprising the respective item identifier and an instruction to access an application server to download the backup software application corresponding the item identifier.

In some instances, the method also includes processing the first file, by the customer care server, prior to communicating the received file to the device management database, the processing comprising reformatting a portion of the first file such that it corresponds to a format acceptable by the device management database. Also, in some instances transmitting the another messaging service message further includes transmitting a Binary Runtime Environment for Wireless (BREW) wakeup call that includes the item identifier. The messaging service message can include a simple messaging service messages (SMS). Also, the receiving a first file can occur periodically.

The detailed description below also discloses a mobile communications network. The network includes a traffic network and a customer care server. The traffic network is configured to support wireless mobile communications. The customer care server is in communication with the traffic network. The customer care server is configured to receive a first file containing an identifier for each respective one of a plurality of mobile stations that are not executing a backup software application for creating a copy of the mobile station's address book for storage on a wireless communications network device, communicate the received file to a device management database, and receive a second file, the second file comprising the identifier of each respective one of the mobile stations that are not executing the backup software application and a corresponding platform identifier for each respective one of the mobile stations, the platform identifier corresponding to a make and model number of the respective mobile station. The customer care server is also configured to map a respective item identifier to each platform identifier, each respective item identifier corresponding to a respective version of the backup software application, transmit a messaging service message to each of a plurality of the mobile stations that are not executing the backup software application, the message comprising an invitation to download the backup software, process a response from at least one of the mobile stations requesting the backup software application, and transmit another messaging service message to the at least one mobile station that requested the backup software application in its response, the another messaging service message comprising the respective item identifier and an instruction to access an application server to download the backup software corresponding the item identifier.

The network can also include a data warehouse in communication with the traffic network. The data warehouse stores the identifier for each respective one of the plurality of mobile stations that are not executing the backup software application. The network can also includes the device management database, which is in communication with the traffic network.

The network can also include a backup server in communication with the traffic network. The backup server stores the copy the mobile station's address book for each mobile station executing the backup software application. The network can also include a application server in communication with the traffic network. The application server stores the backup software application for downloading.

In some instances, the customer care server is also configured to reformat a portion of the first file such that it corresponds to a format acceptable by the device management database. Also, the another messaging service message can include a Binary Runtime Environment for Wireless (BREW) wakeup call that includes the item identifier. In addition, each transmitted messaging service message can be a simple messaging service message (SMS).

The detailed description also discusses an article of manufacture that includes a machine readable storage medium, and a executable program instructions embodied in the machine readable storage medium that when executed by a programmable system of a customer care server causes the system to perform functions. The functions can include receiving a first file containing an identifier for each respective one of a plurality of mobile stations that are not executing a backup software application for creating a copy of the mobile station's address book for storage on a wireless communications network device, communicating the received file to a device management database, and receiving a second file, the second file comprising the identifier of each respective one of the mobile stations that are not executing the backup software application and a corresponding platform identifier for each respective one of the mobile stations, the platform identifier corresponding to a make and model number of the respective mobile station. The functions also include mapping a respective item identifier to each platform identifier, each respective item identifier corresponding to a respective version of the backup software application, transmitting a messaging service message to each of a plurality of the mobile stations that are not executing the backup software application, the message comprising an invitation to download the backup software, processing a response from at least one of the mobile stations requesting the backup software application, and transmitting another messaging service message to the at least one mobile station that requested the backup software application in its response, the another messaging service message comprising the respective item identifier and an instruction to access an application server to download the backup software corresponding the item identifier.

Although described in terms of a backup application, it is clear that the techniques and equipment described herein can be used to supply other applications (e.g., weather, messaging, software updates, etc.) as well.

In one instance, for example, a method distributes a application to a mobile station. The method includes receiving a first file, at a customer care server, containing an identifier for each respective one of a plurality of mobile stations that are not executing the application, communicating the received file to a device management database, and receiving a second file, the second file including the identifier for each respective one of the mobile stations that are not executing the application and a corresponding platform identifier for each respective one of the mobile stations, the platform identifier corresponding to a make and model number of the respective mobile station. The method includes mapping a respective item identifier to each platform identifier, each respective item identifier corresponding to a respective version of the application, transmitting a messaging service message to each of a plurality of the mobile stations that are not executing the application, the message comprising an invitation to download the application, processing a response from at least one of the mobile stations requesting the application, and transmitting another messaging service message to the at least one mobile station that requested the application in its response, the another messaging service message comprising the respective item identifier and an instruction to access an application server to download the application corresponding the item identifier.

The detailed disclosure also discusses a network configured to implement the steps of the method to distribute an application to a mobile station. In addition, the detailed disclosure discusses an article of manufacture having instructions for causing a programmable system of a customer care server to implement the steps of the method to distribute an application to a mobile station and a machine readable storage medium bearing the instructions.

Additional advantages and novel features will be set forth in part in the description which follows, and in part will become apparent to those skilled in the art upon examination of the following and the accompanying drawings or may be learned by production or operation of the examples. The advantages of the present teachings may be realized and attained by practice or use of various aspects of the methodologies, instrumentalities and combinations set forth in the detailed examples discussed below.

BRIEF DESCRIPTION OF THE DRAWINGS

The drawing figures depict one or more implementations in accord with the present teachings, by way of example only, not by way of limitation. In the figures, like reference numerals refer to the same or similar elements.

FIG. 3 is a simplified functional block diagram of a computer that may be configured as a host or server.

FIG. 4 is a simplified functional block diagram of a personal computer or other work station or terminal device.

DETAILED DESCRIPTION

In the following detailed description, numerous specific details are set forth by way of examples in order to provide a thorough understanding of the relevant teachings. However, it should be apparent to those skilled in the art that the present teachings may be practiced without such details. In other instances, well known methods, procedures, components, and/or circuitry have been described at a relatively high-level, without detail, in order to avoid unnecessarily obscuring aspects of the present teachings.

The various examples disclosed herein relate to helping a mobile communications system customer maintain and recover their mobile station's address book. In some cases, in order to increase use of a backup application a solicitation SMS message is pushed to mobile stations not currently using the backup application. When a user accepts the invitation to receive the backup application, a second SMS message is delivered to the mobile station. That second message includes a instructions that direct the mobile station to retrieve the backup application from an application server of the mobile communications network. The backup application is configured for execution on the requesting mobile station. That is, there exist different versions of the backup application for different types (e.g., based on manufacture or operating systems) of mobile stations. The backup application can be configured to automatically and periodically backup or synchronize the address book of the mobile station with a copy of the address book resident on the mobile communications network. The end-user of the mobile station can access the copy of the address book via the Internet or other network.

Figure 1:
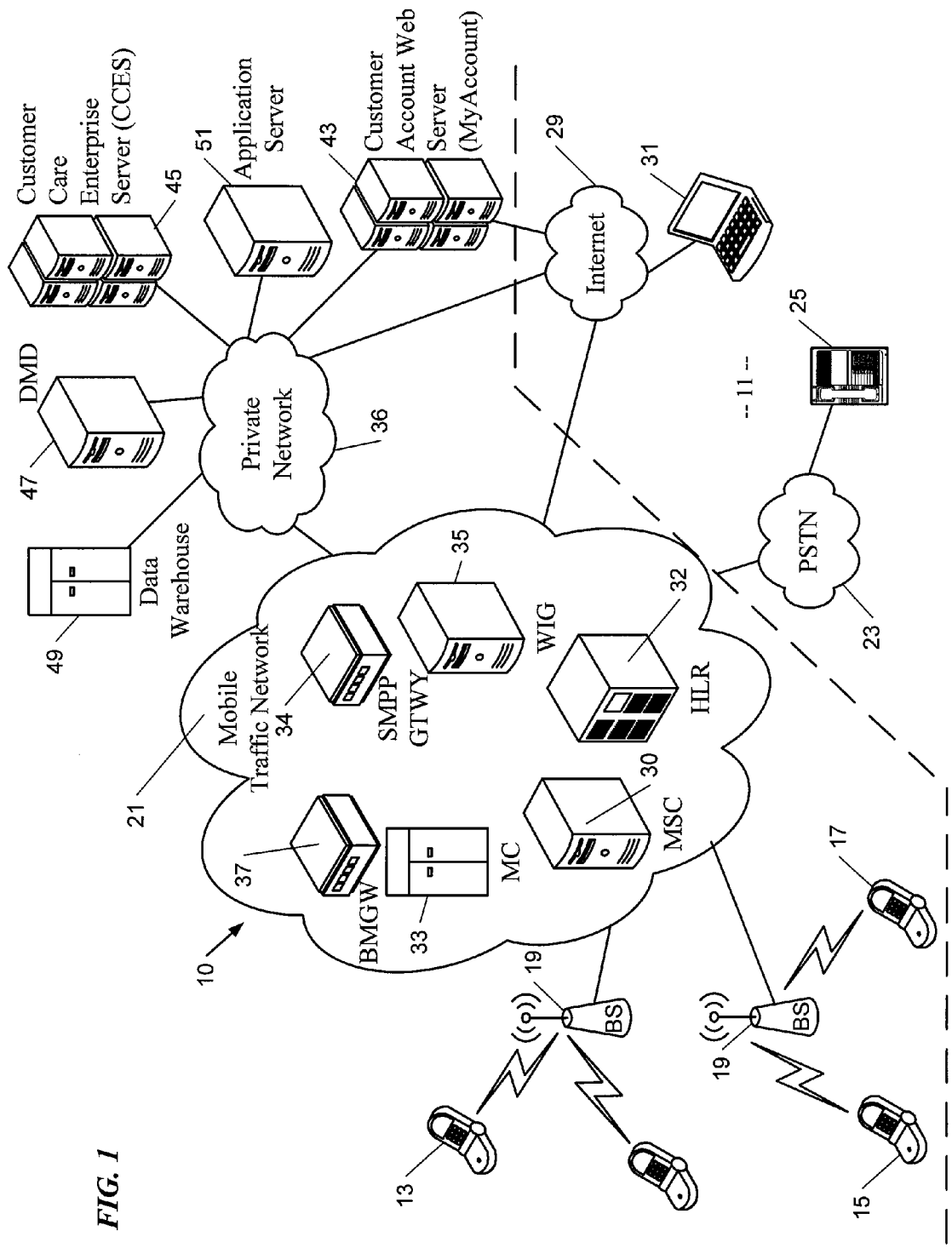
FIG. 1 is a functional block diagram useful in understanding networked elements and systems that may be used in delivering an application to a mobile station over a communications network.

Reference now is made in detail to the examples illustrated in the accompanying drawings and discussed below. FIG. 1 illustrates a number of mobile stations, a mobile communication network coupled to other communication networks and several systems/elements associated with or included in the mobile network for various functions as may be involved in delivering an application to one or more mobile stations. Before beginning, it is helpful to understand that a Mobile Directory Number (MDN) is the telephone number assigned to a mobile station, which a calling party or device inputs in order to call or send a message to the particular mobile station. To call the mobile station, for example, a user of a PSTN telephone or of another mobile station dials the MDN associated with the mobile station. To send a MMS message or a SMS message to destination mobile station, as another example, typically entails input of the MDN of the called mobile station.

A Mobile Identification Number (MN) is an identification number used by the network to signal a particular mobile station. The MIN is formatted like a telephone number, and the MIN may be the same as the MDN. However, increasingly, the network assigns a different number for use as the MIN and translates the MDN input by a calling or other originating party into the MIN that the network uses to establish the call or send the message to the destination mobile station. Of these numbers assigned to the mobile station, the MDN typically is the number or address of the station known and used by other parties or stations.

A platform identifier is an identification number used to indicated a mobile station model and manufacture. The platform identifier can be an alphanumeric string. For example, the platform identifier 2270 can represent a Samsung model U940 mobile station. The platform identifier 129004 can represent a UTStarcom model CDM7075 mobile station. Of course other platform identifiers having various combinations of alpha and numeric identifiers can be used.

An item identifier is an identification number used to represent a version of an application (e.g., a backup application). The item identifier can be an alphanumeric string. For example, the item identifier 2888337 can represent version 1.5.2154 of the application, which is designed for execution on the Samsung model U940 mobile station. The item identifier 288824 can represent version 1.5.1355 of the application, which is designed for execution on the UTStarcom model CDM7075 mobile station.

Hence, FIG. 1 illustrates a mobile communication network 10 as may be operated by a carrier or service provider to provide a wide range of mobile communication services and ancillary services or features to its subscriber customers and associated mobile station (MS) users. The elements generally indicated by the reference numeral 10 generally are elements of the network and are operated by or on behalf of the carrier, although the mobile stations typically are sold to the carrier's customers. The mobile communication network 10 provides communications between mobile stations as well as communications for the mobile stations with networks and stations 11 outside the mobile communication network 10.

For purposes of later discussion, several mobile stations appear in the drawing, to represent examples of the mobile stations that may receive various services via the mobile communication network 10. Today, mobile stations typically take the form portable handsets, laptops with air cards, smartphones or personal digital assistants, although they may be implemented in other form factors. For discussion of messaging service messaging forwarding, we will assume that the mobile stations 13, 15 and 17 and their associated MDNs are each associated with a respective carrier account.

The network 10 allows users of the mobile stations to initiate and receive telephone calls to each other as well as through the public switched telephone network (PSTN) and telephone stations connected thereto. The network 10 allows messaging service type message (e.g., SMS type text messages, EMS type messages, and MMS type messages) to be routed among mobile stations and other devices via the network 10 and via the Internet. The network 10 typically offers a variety of other data services via the Internet, such as downloads, web browsing, e-mail, etc.

The mobile communication network 10 typically is implemented by a number of interconnected networks. Hence, the overall network 10 may include a number of radio access networks (RANs), as well as regional ground networks interconnecting a number of RANs and a wide area network (WAN) interconnecting the regional ground networks to core network elements. A regional portion of the network 10, such as that serving mobile stations 13, 15 and 17, will typically include one or more RANs and a regional circuit and/or packet switched network and associated signaling network facilities.

Physical elements of a RAN operated by one of the mobile service providers or carriers, include a number of base stations represented in the example by the base stations (BSs) 19. Although not separately shown, such a base station 19 typically comprises a base transceiver system (BTS) which communicates via an antennae system at the site of base station and over the airlink with one or more of the mobile stations 13, 15 and 17, when the mobile stations are within range. Each base station typically includes a BTS coupled to several antennae mounted on a radio tower within a coverage area often referred to as a "cell." The BTS is the part of the radio network that sends and receives RF signals to/from the mobile stations that the base station currently serves.

The radio access networks also include a traffic network represented generally by the cloud at 21, which carries the user communications for the mobile stations 13, 15 and 17 between the base stations and other elements with or through which the mobile stations communicate. In some examples, the mobile traffic network includes network elements such as mobile switching centers (MSCs) 30, message centers (MCs) 33, home location registries (HLRs) 32, and other network elements such as wireless interne gateways (WIGs) 35, broadband wireless gateways (BMGW) 37 and visitor location registers (VLRs) (not shown). Other individual elements such as switches and/or routers forming the traffic network 21 are omitted here form simplicity. Various combinations of the network elements cooperate to provide the various application delivery capabilities discussed herein. It is understood that the various network elements can communicate with each other and other aspects of the mobile communications network 10 and networks (e.g., PSTN and Internet) either directly or indirectly.

The mobile switching center (MSC) 30 is responsible for managing communications between the mobile station and the other elements of the network 10. In addition, the MSC 30 is responsible for handling voice calls and messaging service message requests as well as other services (such as conference calls, FAX and circuit switched data). The MSC 30 sets up and releases the end-to-end connection, handles mobility and hand-over requirements during the call. The MSC 30 is sometimes referred to as a "switch". The MSC 30 manages the cell sites, the voice trunks, voicemail, and SS7 links.

The message center (MC) 33, in some examples, allows messaging service messages to be exchanged between mobile telephones and other networks. For SMS messaging, for example, the MC 33 receives packet communications containing text messages and forwards the messages via the signaling resources and the signaling channels to the appropriate mobile stations. The MC 33 will also receive similar messages from the mobile devices and forward them to servers or terminal devices accessible via an Internet Protocol (IP) packet data network. For example, the MC 33 may supply an SMS message to a Wireless Internet Gateway (WIG) 35 that is in communication with the Internet and can communicate with devices terminating on the Internet 29.

In some examples, the MC 33 can also be considered or include functionality that may be considered that of a Short Messaging Service Message Center (SMSC) or a Message Register (MR). Wireless carriers developed the short message service (SMS) to transmit text messages for display on the mobile stations. In many existing network architectures, the SMS traffic uses the signaling portion of the network 21 to carry message traffic between a Short Message Service Center (SMSC) 33 and the mobile stations. The SMSC supports mobile station to mobile station delivery of text messages. However, the SMSC also supports communication of messages between the mobile stations and devices coupled to other networks. For example, the SMSC 33 may receive incoming IP message packets from the Internet 29 for delivery via the network 21, one of the base stations 19 and a signaling channel over the air link to a destination mobile station. For this later type of SMS related communications, the network 10 also includes one or more Short Message Peer-to-Peer (SMPP) protocol gateways 34. The SMPP gateway 34 provides protocol conversions, between SMPP as used by the SMSC 33 and the protocols used on the Internet 29 or other IP network. SMPP messages ride on IP transport, e.g. between the gateway 34 and the SMSC 33.

In other examples, the MC 33 can include functionality related to the Enhanced Messaging Service (EMS) or Multimedia Messaging service (MMS). An EMS message can have special text formatting (such as bold or italic), animations, pictures, icons, sound effects and special ring tones. MMS messages support the sending and receiving of multimedia messages (e.g., images, audio, video and their combinations) to (or from) MMS-enabled mobile stations. In some examples, the MC 33 can be considered in whole or in part a multimedia messaging service center (MMSC).

Although a single MC 33 is shown, a network 10 will often have many geographically dispersed MCs 33. The MCs 33 can include destination routing tables (DRTs). In essence the DRTs are databases within the MCs 33. A DRT contains a list of the MDNs which are associated with the various MCs 33. For example, a first MDN is associated with a MC 33 in Minnesota while a second MDN is associated with a MC 33 in Virginia. The DRTs are used to determine which MC 33 should attempt to deliver an incoming messaging service message to the destination MDN. For example, if a user associated with the MC in Minnesota sends an SMS to a user associated with the MC 33 in Virginia, the Minnesota MC 33 sends the SMS to the Virginia MC 33 for delivery to the destination MDN. The communication among the MCs 33 occurs using know protocols such SMPP and the like.

The HLR 32, in some examples, stores a subscriber profile for each of the wireless subscribers and their associated mobile stations 13, 15, and 17. The HLR 32 may reside in an MSC 30 or in a centralized service control point that communicates with the MSC(s) 34 via an out-of-band signaling system such as an SS7 network. The HLR 32 stores for each mobile subscriber the subscriber's mobile directory number (MDN), the mobile identification number (MIN), and information specifying the wireless services subscribed to by the mobile subscriber, such as numeric paging or text-based paging, data communication services, etc. Of course, the HLR 32 can also be a stand-alone device. The HLR also tracks the current point of attachment of the mobile station to the network, e.g., the identification of the MSC 30 with which the mobile station is currently registered to receive service.

The visitor location register (VLR) (not shown) is, in some examples, a temporary database of the mobile stations that have roamed into the particular area which it serves. The VLRs for a region often are implemented in or in association with a MSC 30. Each base station 19 in the network is served by a single VLR, hence a subscriber cannot be present in more than one VLR at a time. The data stored in the VLR has either been received from the HLR 32, or collected from the mobile station.

The SMPP gateway 34 provides functionality to transport messaging service messages to other mobile communication networks and also receive messaging service messages from other networks. The SMPP gateway 34 supports communications using the SMPP protocol. SMPP gateways 34 are Short Message Peer-to-Peer (SMPP) gateways 34 used to connect the wireless communication network (such as an Internal Protocol IP network on the left of the Gateway) to another network (such as a public Internet network on the right of the Gateway). The SMPP Gateway 34 allows the MC 33 to receive and send messages in IP packet format. The SMPP Gateway 34 is an entity within the wireless network 10 that acts as an intermediary between the wireless service provider network and other networks. For example, the SMPP Gateway 34 converts messages in protocol(s) used by other applications and devices, e.g. Extensible Markup Language (XML), Hypertext Mail Protocol (HTMP), etc., to and from the SMPP protocol. The SMPP messages ride on IP transport, e.g. between the SMPP Gateway 34 and the MC 33.

The wireless interne gateway (WIG) 35 provides functionality that allows the WIG 35 to send messages to any number of peer gateways on the Internet 29. In some examples, the WIG 35 can also facilitate communications across different types of mobile communication networks, either through the Internet 29 or directly to the other mobile communications networks, similar to the functionality of the SMPP Gateway 34. For example, the WIG 35 provides the ability of a mobile station connected to a GSM network to send messaging service message to a mobile station on a CDMA type mobile communication network. The WIG 35 can communicate with the gateways of other carriers (particularly other wireless carriers) having different and occasionally changing kinds of message destinations using different and occasionally changing protocols.

The broadband messaging gateway (BMGW) 37 provides functionality that allows the BMGW 37 to send messages to any number of peer gateway on the Internet 29. Typically, the BMGW is used in a network 10 that provides Evolution-Data Optimized (EV-DO) or Long Term Evolution (LTE) type services. The BMGW 37 is a gateway that provides access to a packet date serving node (PDSN) (not shown). The BMGW 37 provides functionality similar to the WIG and the SMDPP GW but for the EV-DO and LET type networks.

The traffic network portion 21 of the mobile communication network 10 connects to a public switched telephone network 23. This allows the network 10 to provide voice grade call connections between mobile stations and regular telephones connected to the PSTN 23. The drawing shows one such telephone at 25.

The traffic network portion 21 of the mobile communication network 10 connects to a public packet switched data communication network, such as the network commonly referred to as the "Internet" shown at 29. In some configurations, the WIG 35 and/or the BMGW 37 provides an interface between the traffic network portion 21 of the network 10 and the Internet 29. Packet switched communications via the traffic network 21 and the Internet 29 may support a variety of user services through the network 10, such as mobile station communications of text and multimedia messages, e-mail, web surfing or browsing, programming and media downloading, etc.

In practice today, the carrier will also offer its subscribers on-line access to a variety of functions related to the subscribers' accounts, such as review of billing statements and usage data, on-line payment, subscription changes, password control or the like. For that purpose, the carrier in our example operates a customer account web server 43, offering a 'MyAccount'(Now MyVerizon) type subscriber interface via the Internet. Hence, a user's terminal, such as PC 31, may be used to access on-line information about a subscriber's account, which the mobile carrier makes available via the carrier's MyAccount web site accessible through the Internet 29. Of note for purposes of the present discussions of messaging service messaging, the web site provides secure user access to a backup copy of the mobile stations address book. Changes can be made to this copy and propagated back to the mobile station 13.

The private network 36 facilitates communications among various components and systems of the network 10. Various packet-based communication protocols can be used. Examples include TCP/IP, UDP/IP, XML over HTTP, and others. In some instances, a list of what mobile stations are not currently using a backup application is stored within the network 10. That list can be communicated to another component of the network via the private network 36 for processing and updating with additional information. The additional information can be received from other components of the network 10 over the private network 36. Once complete, the update list can be communicated via the private network 36 to, for example, the SMPP gateway 34, which in turn, transmits a solicitation SMS message to those mobile stations on the list.

The network 10 can include a Customer Care Enterprise Server 45 ("CCES") that is communication with the other components of the network 10 via the private network 36. The CCES 45 can be a platform of servers that provide various functionalities. Examples include billing systems, network provisioning systems such as the Mobile Telephone Administration System or "MTAS", client account administration systems, and the like. In addition, the CCES 45 can process data received from other components of the network 10. For example, the CCES 45 can receive a list of mobile stations from, for example a data warehouse 49 via the private network 36. The list can include the MDN of the movable stations and additional information such as the mobile station's electronic serial number ("ESN") or mobile equipment identifier ("MEID"). The CCES 45 can reformat this information and repackage it for communication to another component of the network 10 (e.g., a device management database 47). The CCES 45 can also add an item identifier for each mobile station 13 on the list of non-subscribing mobile stations. This information is then passed to another component on of the network 10 (e.g., the SMPP gateway 34) for creation and transmission of the solicitation messages. Further details of the CCES 45 processing are described below in more detail.

The network can also include a device management database ("DMD") 47 that is in communication with the other components and systems of the network 10 via the private network 36. The DMD 47 stores a list of platform identifiers that are based on the ESN or MEID of the respective mobile stations 13. The DMD can receive a list of mobile stations not currently using the backup application from the CCES 45. In response, the DMD can supplement that information in list with the platform identifiers for each respective mobile station 13 in the list. As mentioned previously, the platform identifiers represent a mobile station's manufacture and mobiles station model. For example, the platform identifier 2236 can represent that a respective mobile station 13 is a Samsung model U900 mobile station. Once the platform identifiers are added, the update list of mobile stations 13 is transmitted to another component of the network 10 (e.g., back to the CCES 45) for additional processing.

The network 10 also include a data warehouse 49 in communication with the other components of the network 10 via the private network 36. The data warehouse 49 stores information about the various mobile stations 13 operating on the network 10. The data warehouse 49 can maintain a list of mobile station not currently using a backup application. In addition, the data warehouse 49 can generate the list of mobile station 13 using records stored in a database (not shown). In addition, the data warehouse can store information that is used in other reporting and analysis functions.

The network 10 can include one or more application servers 51 that are in communication with the other systems and components of the network 10 via the private network 36. The application server 51 can store various applications such as the backup application. Of course, the application servers can store various versions of the applications as well. The application server 51 can process and respond to requests for an application received from a mobile station 13. In response, the application server 51, alone or in combination with other network components, can facilitate the downloading of the requested application over the air.

With that overview of the system, it may be helpful now to consider a high-level discussion of a backup, or other application, is pushed to one or more mobile stations operating on the network 10. Again, the backup application provides a mechanism for mobile station users to maintain a copy of their address books on the mobile network 10 in case of the loss of a mobile station or replacement thereof. Also, in some instances, changes to the address book can be made via the Internet and updated to the mobile station 13.

In one instance, the CCES 45 receives, from the data warehouse 49, a file containing a list of MDNs and corresponding ESN/MEIDs that correspond to those mobile stations that are not currently using a backup application. The CCES 45 processes the received list by rearrange or manipulating the contents of the list. After such manipulation, the list is forwarded to the DMD 47 for inclusion of the corresponding platform ids. After populating the list with the corresponding platform identifiers the updated list is returned to the CCES 45 for further processing.

The CCES 45 uses the update list with the platform identifiers to determine which item identifier, which corresponds to a version of the backup application, is needed. In some instances, this information can used to determine whether a particular mobile station supports a binary runtime environment for wireless ("BREW") application. After adding the corresponding item identifiers to the list of mobile stations 13 not currently using the backup application, the list can be used to send solicitation messages to those mobile stations 13.

In some instances, the SMPP gateway 34 prepares and transmits an SMS message to at least some of the mobile stations 13. In some cases, the CCES 45 prepares the messages and delivers them via the SMPP gateway 34. The message can include an invitation to download the backup application. The responses are received, directly or indirectly, by the CCES 45. When the response indicates that the user wants to the backup application, the CCES 45 prepares and delivers, in some instances via the SMPP gateway 34, a second SMS message to those mobiles stations 13 wanting the application.

The second SMS message includes, in some instances a BREW wake-up message, the corresponding item identifier, and the location (e.g., IP address) of the application server 51 that has the correct version of the application for that particular mobile station 13. In response, the mobile station 13 downloads the application and begins backing up their address book. The copy of the address book can be stored at the customer account web server 43 and associated with the correct account.

The end user of the mobile can thereafter access the copy of the address book via the Internet 29 using the customer account web server 43. The end user can manipulate the copy of the address book and propagate those changes back to the mobile station 13. Also, in the case of a lost or replaced mobile station, the copy of the address book can be forwarded to the replacement mobile station about network 10 access by the replacement mobile station.

Figure 2:
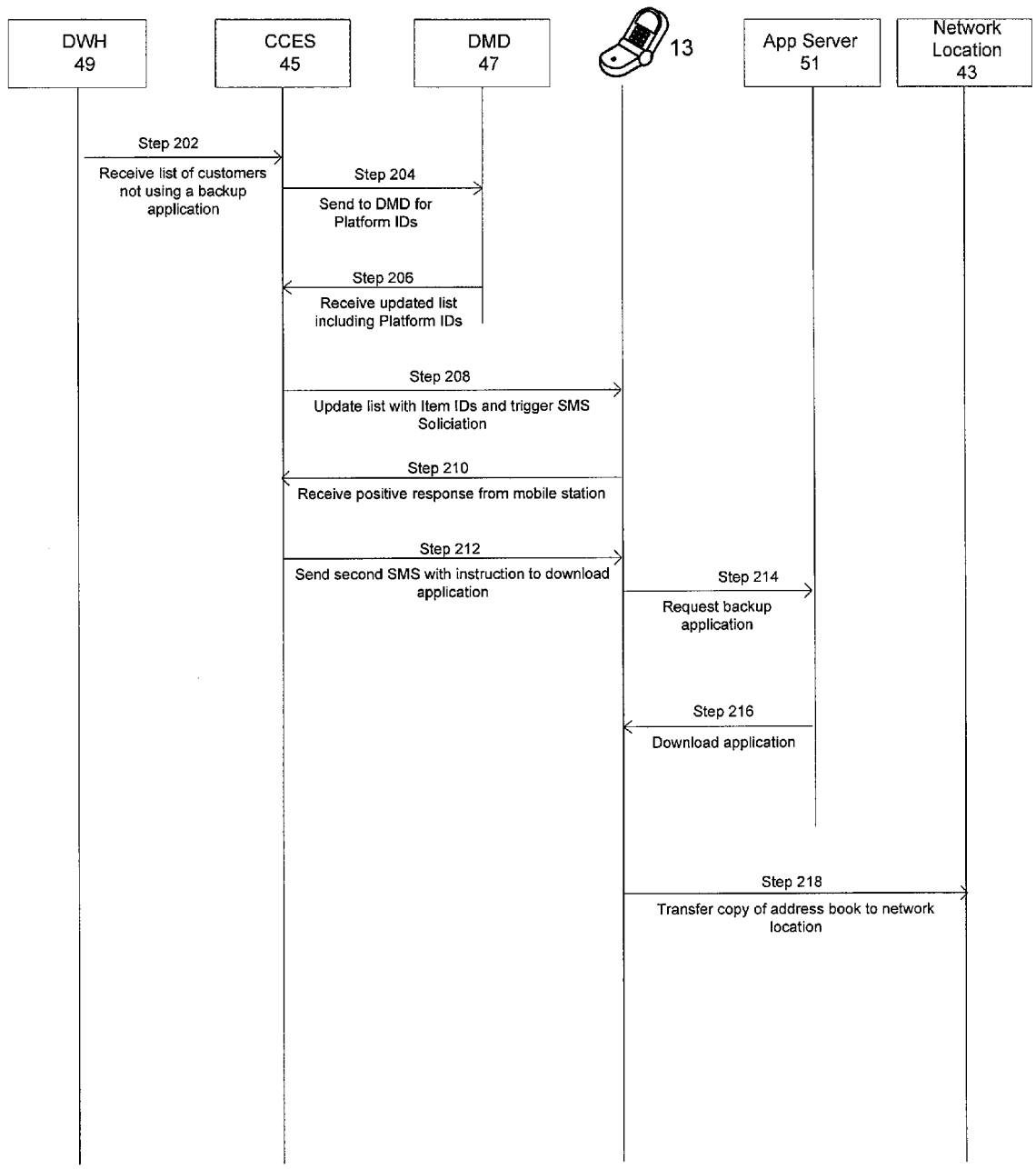
FIG. 2 is a flow chart useful in understanding a process for delivering an application to a mobile station over a communications network.

A method showing the operation of various components of the network 10 used to deliver an application to one or more mobile stations over the network 10 is shown and described with reference to FIG. 2. The method includes various communications among components of the network 10. Some of those communications can occur over the private network 36 using protocols such as TCP/IP, XML over HTTP, UDP/IP, and the like. Some of the communications can occur over the air using know wireless communications protocols.

The method includes receiving (step 202) at the CCES 45 a list (e.g., a comma delimited fixed format file) of customers that are not currently using a backup application. The list is received from the data warehouse 49 and includes the MDN and ESN/MEID for each customers mobile station 13. The list can be communicated to the CCES 45 using XML over HTTP or some other protocol. The list, in some instances, may require some reformatting. Thus, the CCES 45 can arrange the list of MDN and ESN/MEID as required.

The CCES 45 forwards (step 204) the received list to the device management database ("DMD") 47. In response, the DMD adds the platform identifier for each MDN and ESN/MEID combination in the list. Again, the platform identifier corresponds to a manufacture of the mobile station and a model number for that mobile station 13. For example, the platform identifier 5014 can represent a Kyocera model KX414c mobile station and the platform identifier 8012 can represent that Motorola A840 mobile station. Once update, the list of MDNs, ESN/MEIDs, and platform identifiers is returned to the CCES 45. Again, this communication can occur using XML over HTTP or some other communications protocol.

When the CCES 45 receives (step 206) the list from the DMD, it updates (step 208) the list with item identifiers for each MDN. Again, the item identifier corresponds to a version or the application stored on the application server 51. Continuing with the examples above, the corresponding item identifier for the Kyocera model KX414c can be 2888745 and corresponds to version 1.0.2101 of the application. Similarly, the item identifier that is associated with the Motorola A840 mobile station can be 2888203 and corresponds to version 1.2.648 of the application.

After adding the corresponding item identifiers, the CCES 45, alone or in cooperation with SMPP Gateway 34 or some other network component, prepares and transmits a solicitation messaging service message (e.g., an SMS message) to each of the listed MDNs. The solicitation message can include an invitation to download the backup application free of charge. In addition to SMS messages, enhanced messaging service messages (EMS) and multimedia messaging service messages (MMS), can be used. Of course, various combinations of these messaging service message types can be used.

If the end-user of the mobile station 13 receiving the solicitation message responds, that response is received and communicated to the CCES 45. If the response is negative, that is, the end-user does not want to download the backup application, nothing further happens for that mobile station. However, when a positive response is received (step 210) the CCES 45 alone, or in combination with other network elements such as the SMPP gateway 34, prepares a second messaging service message for that mobile station. The second messaging service message can include a BREW wake-up call, the item identifier for that mobile station, and location information (e.g., an IP addresses) for the application server 51 storing that version of the application. The CCES 45 sends (step 212) alone, or in cooperation with the SMPP gateway 34, the second SMS message to the mobile station 13.

Once received by the mobile station 13, the SMS message is processed and causes the mobile station 13 to request (step 214) the backup application from the application server 51. The request can be communicated to the application server 51 using know wireless communication protocols. In response, the application server 51 and mobile station 13 cooperate to download (step 216) the backup application to the mobile station 13.

Once downloaded, the mobile station 13 executes the backup application. During the initial setup of the backup application, user preferences are gathered. In addition, a base copy of the mobile station's address book is transferred (step 218) to a network location and associated with the subscribers account. Access to the copy of the address book can be granted through the Internet 29 by accessing the subscribers account using the customer account web server 43. Changes can be made to the copy of the address book and synchronized with the mobile station 13 at a later time. The synchronization can occur using known methods. For example complete replicas of the address books can be exchanged or only those records that have changed (e.g., a delta approach).

FIGS. 3 and 4 provide functional block diagram illustrations of general purpose computer hardware platforms. FIG. 3 illustrates a network or host computer platform, as may typically be used to implement a server. FIG. 4 depicts a computer with user interface elements, as may be used to implement a personal computer (PC) or other type of work station or terminal device, although the computer of FIG. 4 may also act as a server if appropriately programmed. It is believed that those skilled in the art are familiar with the structure, programming and general operation of such computer equipment and as a result the drawings should be self-explanatory.

The hardware elements, operating systems and programming languages of such computers are conventional in nature, and it is presumed that those skilled in the art are adequately familiar therewith. Of course, the server functions may be implemented in a distributed fashion on a number of similar platforms, to distribute the processing load.

Hence, aspects of the methods of messaging service message forwarding outlined above may be embodied in programming. Program aspects of the technology may be thought of as "products" or "articles of manufacture" typically in the form of executable code and/or associated data that is carried on or embodied in a type of machine readable medium. "Storage" type media include any or all of the memory of the computers, processors or the like, or associated modules thereof, such as various semiconductor memories, tape drives, disk drives and the like, which may provide storage at any time for the software programming. All or portions of the software may at times be communicated through the Internet or various other telecommunication networks. Such communications, for example, may enable loading of the software from one computer or processor into another computer or processor. For example, the software can be communicated to application server 51. Thus, another type of media that may bear the software elements includes optical, electrical and electromagnetic waves, such as used across physical interfaces between local devices, through wired and optical landline networks and over various air-links. The physical elements that carry such waves, such as wired or wireless links, optical links or the like, also may be considered as media bearing the software. As used herein, unless restricted to tangible "storage" media, terms such as computer or machine "readable medium" refer to any medium that participates in providing instructions to a processor for execution.

Hence, a machine readable medium may take many forms, including but not limited to, a tangible storage medium, a carrier wave medium or physical transmission medium. Non-volatile storage media include, for example, optical or magnetic disks, such as any of the storage devices in any computer(s) or the like, such as may be used to implement the data aggregator, the customer communication system, etc. shown in the drawings. Volatile storage media include dynamic memory, such as main memory of such a computer platform. Tangible transmission media include coaxial cables; copper wire and fiber optics, including the wires that comprise a bus within a computer system. Carrier-wave transmission media can take the form of electric or electromagnetic signals, or acoustic or light waves such as those generated during radio frequency (RF) and infrared (IR) data communications. Common forms of computer-readable media therefore include for example: a floppy disk, a flexible disk, hard disk, magnetic tape, any other magnetic medium, a CD-ROM, DVD or DVD-ROM, any other optical medium, punch cards paper tape, any other physical storage medium with patterns of holes, a RAM, a PROM and EPROM, a FLASH-EPROM, any other memory chip or cartridge, a carrier wave transporting data or instructions, cables or links transporting such a carrier wave, or any other medium from which a computer can read programming code and/or data. Many of these forms of computer readable media may be involved in carrying one or more sequences of one or more instructions to a processor for execution.

Those skilled in the art will recognize that the present teachings are amenable to a variety of modifications and/or enhancements.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

APPENDIX

Acronym List

The description above has used a large number of acronyms to refer to various services, messages and system components. Although generally known, use of several of these acronyms is not strictly standardized in the art. For the convenience of the reader, the following list correlates terms to acronyms, as used in the detailed description above.

BMGW: broadband messaging gateway
BS: base station
BTS: base transceiver system
CDMA: code division multiple access
DMD: device management database
DRT: destination routing table
ESN: electronic serial number
EV-DO: evolution-data optimized
EMS: enhanced messaging service
GSM: global system for mobile communications
HLR: home location register
HTMP: hypertext mail protocol
HTTP: hyper-text transfer protocol
IP: interne protocol
IR: infrared
LTE: long term evolution
MC: message center
MDN: mobile directory number
MIN: mobile identification number
MMS: multi-media messaging service
MR: message register
MS: mobile station
MSC: mobile switching center
PDSN: packet data switch node
PC: personal computer
PSTN: public switched telephone network
RAN: radio access network
RF: radio frequency
SMDPP: SMS delivery point-to-point
SMPP: simple messaging service point-to-point
SMS: simple messaging service
SMSC: short message service center
SS7: signaling system 7
STP: signaling transfer points
TCP: transmission control protocol
UDP: user datagram protocol
VLR: visitor location register
WAN: wide area network
WIG: wireless internet gateway
XML: extensible markup language

What is claimed is:

1. A method comprising steps of:
receiving, at a customer care server, a first file containing a mobile station mobile directory number and a mobile station identifier for each respective one of a plurality of mobile stations that are not operating any version of a particular application;

prior to communicating the received first file to the device management database, reformatting by a customer care server a portion of the first file to correspond to a format acceptable by the device management database;

communicating, by the customer care server, the reformatted first file to a device management database;

receiving a second file, by the customer care server from the device management database, the second file comprising the mobile station identifier for each respective one of the mobile stations that are not operating any version of the particular application and a corresponding platform identifier for each respective one of the mobile stations, the platform identifier corresponding to a make and model number of the respective mobile station;

mapping a respective item identifier to each platform identifier, each respective item identifier corresponding to a respective version of the particular application;

transmitting based on the mobile station mobile directory numbers in the first file a messaging service message through a wireless communications network to each of a plurality of the mobile stations that are not operating any version of the particular application, the message comprising an invitation to download the particular application;

processing a response from at least one of the mobile stations requesting the application;

transmitting another messaging service message to the at least one mobile station that requested the particular application in its response, the another messaging service message comprising the respective item identifier and an instruction to access an application server to download the particular application corresponding to the respective item identifier;

receiving, at a wireless communications network device via the wireless communication network, information generated by the particular application on the at least one mobile station that downloaded the particular application;

associating the received information with a subscriber's account;

storing the received information in a database associated with the subscriber's account, wherein the stored information is accessible through a data network different than the wireless communications network; and providing access to the stored information associated with the subscriber's account in response to a user request.

2. The method of claim 1, wherein transmitting the another messaging service message further comprises transmitting a Binary Runtime Environment for Wireless (BREW) wakeup call that includes the item identifier.

3. The method of claim 1, wherein each transmitted messaging service message comprises a simple messaging service message.

4. The method of claim 1, wherein the particular application is a backup software application for creating a copy of the mobile station's address book for storage on a wireless communications network device and the information is the copy of the address book.

5. The method of claim 4, wherein the receiving the first file containing a mobile station identifier for each respective one or more mobile stations that are not executing the backup software application occurs periodically.

6. The method of claim 4, wherein the first file contains only the mobile station identifiers for each respective one of a plurality of mobile stations that are not executing the backup software application for creating a copy of the mobile station's address book for storage on a wireless communications network device.

7. The method of claim 4, wherein in the step of receiving the first file, the first file is received from a database containing information on mobile station identifiers for the plurality of mobile stations that are not executing the backup software application.

8. A mobile communications network, comprising:
a customer care server comprising a processor and memory configured to perform functions, the functions including:

receive, at a customer care server, a first file containing a mobile station mobile directory number and a mobile station identifier for each respective one of a plurality of mobile stations that are not operating any version of a particular application:

prior to communicating the received first file to the device management database, reformat a portion of the first file to correspond to a format acceptable by the device management database;

communicate, by the customer care server, the reformatted first file to a device management database;

receive a second file, by the customer care server from the device management database, the second file comprising the mobile station identifier for each respective one of the mobile stations that are not operating any version of the particular application and a corresponding platform identifier for each respective one of the mobile stations, the platform identifier corresponding to a make and model number of the respective mobile station;

map a respective item identifier to each platform identifier, each respective item identifier corresponding to a respective version of the particular application;

transmit based on the mobile station mobile directory numbers in the first file a messaging service message through a wireless communications network to each of a plurality of the mobile stations that are not operating any version of the particular application, the message comprising an invitation to download the particular application;

process a response from at least one of the mobile stations requesting the application;

transmit another messaging service message to the at least one mobile station that requested the particular application in its response, the another messaging service message comprising the respective item identifier and an instruction to access an application server to download the particular application corresponding to the respective item identifier;

receive, at a wireless communications network device via the wireless communication network, information generated by the particular application from the at least one mobile station that downloaded the particular application;

associate the received information with a subscriber's account;

store the received information in a database associated with the subscriber's account, wherein the stored information is accessible through a data network different from the wireless communications network; and provide access to the stored information associated with the subscriber's account in response to a user request.

9. The network of claim 8, further comprising a data warehouse, in communication with traffic network, the data warehouse storing the mobile station identifier for each respective one of the plurality of mobile stations that are not operating the particular application.

10. The network of claim 8, further comprising the device management database in communication with the traffic network.

11. The network of claim 8, wherein the application server is configured to store the particular application for downloading.

12. The network of claim 8, wherein the another messaging service message comprises a Binary Runtime Environment for Wireless (BREW) wakeup call that includes the item identifier.

13. The network of claim 8, wherein each transmitted messaging service message comprises a simple messaging service message.

14. The network of claim 8, wherein the particular application is a backup software application for creating a copy of the mobile station's address book for storage on a wireless communications network device and the information is the copy of the address book.

15. The network of claim 14, further comprising a backup server in communication with the traffic network, the backup server storing the copy of the mobile station's address book for each mobile station executing the backup software application.

16. An article of manufacture, comprising:
a non-transitory machine readable storage medium; and
executable program instructions embodied in the non-transitory machine readable storage medium that, when executed by a programmable system of a customer care server, configure the programmable system to perform functions, including functions to:
receive, at a customer care server, a first file containing a mobile station mobile directory number and a mobile station identifier for each respective one of a plurality of mobile stations that are not operating any version of a particular application;
prior to communicating the received first file to the device management database, reformat a portion of the first file to correspond to a format acceptable by the device management database;
communicate, by the customer care server, the reformatted first file to a device management database;
receive a second file, by the customer care server from the device management database, the second file comprising the mobile station identifier for each respective one of the mobile stations that are not operating any version of the particular application and a corresponding platform identifier for each respective one of the mobile stations, the platform identifier corresponding to a make and model number of the respective mobile station;
map a respective item identifier to each platform identifier, each respective item identifier corresponding to a respective version of the particular application;
transmit based on the mobile station mobile directory numbers in the first file a messaging service message through a wireless communications network to each of a plurality of the mobile stations that are not operating any version of the particular application, the message comprising an invitation to download the particular application;
process a response from at least one of the mobile stations requesting the application;
transmit another messaging service message to the at least one mobile station that requested the particular application in its response, the another messaging service message comprising the respective item identifier and an instruction to access an application server to download the particular application corresponding to the respective item identifier;
receive, at a wireless communications network device via the wireless communication network, information generated by the particular application from the at least one mobile station that downloaded the application;
associate the received information with a subscriber's account;
store the received information in a database associated with the subscriber's account, wherein the stored information is accessible through a data network different from the wireless communications network; and
provide access to the stored information associated with the subscriber's account in response to a user request.

17. The article of manufacture of claim 16, wherein the function of transmitting the another messaging service message further comprises the function of transmitting a Binary Runtime Environment for Wireless (BREW) wakeup call that includes the item identifier.

18. The article of manufacture of claim 16, wherein each transmitted messaging service messages comprises a simple messaging service message.

19. The article of manufacture of claim 16, wherein the particular application is a backup software application for creating a copy of the mobile station's address book for storage on a wireless communications network device and the information is the copy of the address book.

20. The article of manufacture of claim 19, wherein the function of receiving the first file containing a mobile station identifier for each respective one or more mobile stations that are not executing the backup software application occurs periodically.

* * * * *